Nov. 12, 1957  H. W. HAPMAN  2,812,849
FLOW-REGULATING CONDUIT DEVICE
Original Filed Oct. 26, 1946

Inventor
Henry W. Hapman
Barthel + Bugbee
Attorneys

United States Patent Office 2,812,849
Patented Nov. 12, 1957

2,812,849

FLOW-REGULATING CONDUIT DEVICE

Henry W. Hapman, Hickory Corners, Mich., assignor of forty percent to Hannah Jane Hapman, Hickory Corners, Mich.; Melvin S. Huffaker and Hannah Jane Hapman, executors of said Henry W. Hapman, deceased Original application October 26, 1946, Serial No. 705,942. Divided and this application May 19, 1952, Serial No. 288,737

2 Claims. (Cl. 198—220)

This invention relates to material-handling equipment.

One object of this invention is to provide a gateless self-clogging flow-regulating device for comminuted solid material and consisting of a vibrating device associated in combination with a slightly inclined loading or discharge conduit so as to eliminate the need for gates in the conduit by causing the conduit to become self-clogged with the material until it is vibrated to dislodge the material and cause it to load or unload the conveyor as the case may be.

This application is a division of my co-pending application Serial No. 705,942 filed October 26, 1946, for Material-Removing Device for Conveyors, and now Patent No. 2,615,559.

Figure 1:
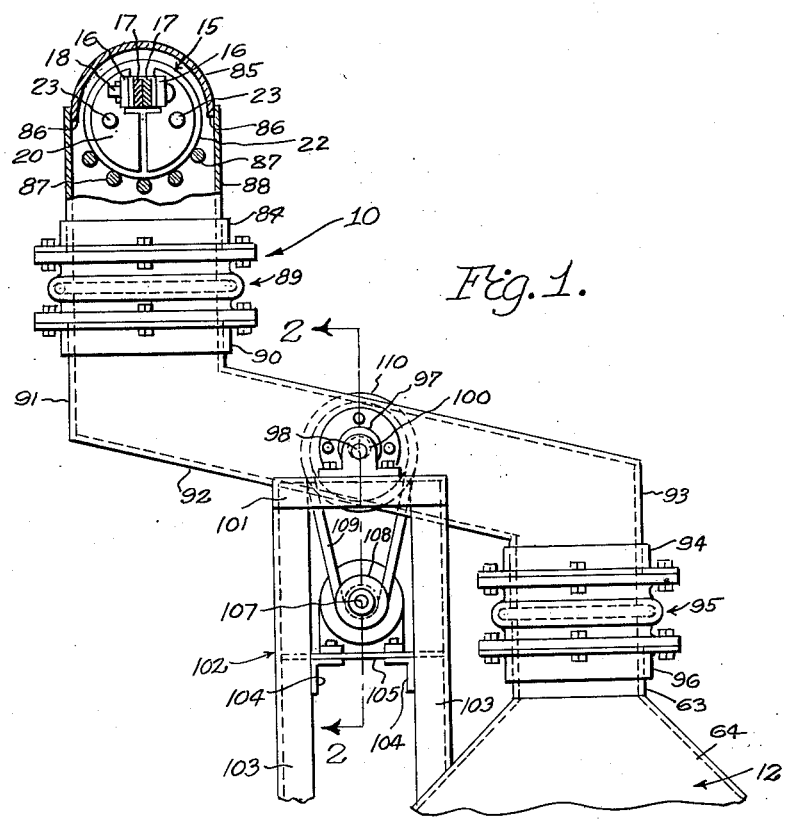
Figure 2:
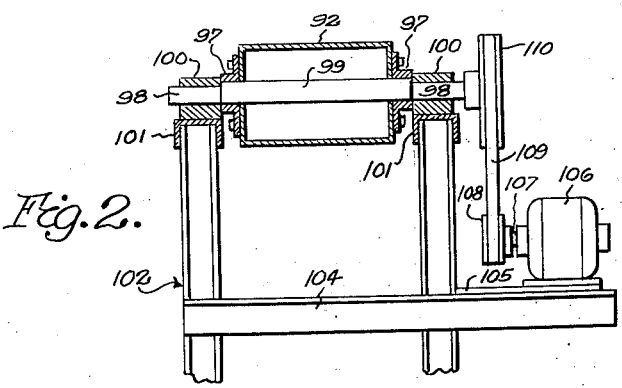

Other objects and advantages of the invention will become apparent during the course of the following description of the accompanying drawings, wherein:

Figure 1 is a side elevation, with the conveyor in cross-section, of a gateless self-clogging flow-regulating device for comminuted solid material, according to one form of the invention and including a conveyor vibrating device applied to a self-clogging conduit connected to a conveyor to eliminate the need for conduit gates; and Figure 2 is a vertical section taken along the line 2—2 in Figure 1.

Referring to the drawings in detail, Figures 1 and 2 show a vibratable gateless self-clogging flow-regulating device for comminuted solid material, generally designated 10, according to one embodiment of the invention. In its direct form, the device 10 receives the discharge of comminuted solid material from a conveyor above, generally designated 15, and directs it into a bin below, generally designated 12. In the inverted arrangement (not shown), the device 10 receives the discharge of comminuted solid material from the bin 12 above and directs it below into a receiver such as a conveyor 15, bin, vehicle or the like.

The conveyor 15 consists of pairs of spaced parallel links 16 and 17 connected by pivot pins 18 to the arm 19 projecting axially in opposite directions from spaced clamping plates or half discs 20 mounted side-by-side but separated from one another by gaps 21. Clamped between the oppositely-facing pairs of clamping plates 20, as by the bolts 23, are conveyor flights 22, preferably of elastic deformable material, such as rubber or synthetic rubber. This invention is not concerned with the details of the conveyor 15, a suitable form of which is disclosed and claimed in my co-pending application Serial No. 676,546, filed June 13, 1946, for Flight Conveyor, which on October 28, 1952, became U. S. Patent No. 2,615,559. Any convenient and suitable form of conveyor 15 may be used in connection with this invention.

The flight conveyor 15 runs in a conduit portion 85, the bottom portion of which is cut away to provide an opening 86 and longitudinal bars 87 mounted across the opening. A conduit 88 is secured to the conduit 85 and extends downward from the opening 86 terminating in a flanged collar 84 secured thereto as by welding. A flanged flexible connector 89 is bolted to the flanged collar 84 and also to a flanged collar 90 on the upwardly-extending portion 91 of an inclined conduit 92, the lower portion 93 of which extends vertically downward to a flanged collar 94 welded or otherwise secured thereto. As explained below in connection with the operation of the invention, the conduit 92 is inclined at a slope which is sufficiently slight to normally frictionally halt and clog the flow of material therethrough but sufficiently steep to cause flow therethrough in response to agitation thereof. A flanged flexible connector 95 is bolted to the flanged collar 94 at its upper end and to a flanged collar 96 at its lower end. The flanged collar 96 is connected to a conduit 63 leading to a bin top 64 of a bin 12.

The flexible connectors or couplings 89 and 95 are tubular in form, made of elastic deformable material such as rubber or synthetic rubber, and bolted at their flanged opposite ends to the flanged collars 87, 90 and 94, 96 respectively. The flexible connectors 89 and 95 are internally grooved to receive reinforcing rings 89a and 95a respectively and are of a conventional design, the details of which form no part of the present invention.

Secured to the opposite sides of the inclined conduit 92 are flanged bearing bushings 97 which rotatably support the opposite ends of a shaft 98, the central portion 99 of which is eccentric to the shaft 98. The shaft 98 is rotatably mounted in journal boxes 100 (Figure 2) which in turn are bolted to the top members 101 of a table-like frame, generally designated 102. The frame 102 is provided with uprights 103 of channel or angle cross-section and is provided with angle cross members 104 which extend outward to support a shelf 105. Mounted on the shelf 105 is a motor 106, the shaft 107 of which carries a pulley 108 which drives a belt 109 leading to a pulley 110 mounted on the eccentric shaft 98.

In the operation of the invention, as the flight conveyor 15 conveys the comminuted solid material through the conduit 85 and across the bars 87 at the bottom of the opening 86, the material falls down through the spaces between the bars and through the vertical conduit portions 88 and 91 into the inclined conduit portion 92. When the motor 106 is not operating, the pitch or slope of the inclined conduit 92 is so slight that the material piles up in it, and clogs the conduit 92. Thus, the material itself, by piling up in the conduit 92, serves as its own gate and no gate is necessary.

When it is desired to cause the material to flow downward into the bin 12, the operator starts the motor 106, thereby rotating the shaft 98 and causing its eccentric portion 99 to move the inclined conduit 92 rapidly up and down, thereby agitating the conduit 92 by shaking or vibrating it. This vibration causes the material to start moving downward along the inclined conduit 92, unclogging the conduit and effecting a steady flow of material into the bin 12 so long as the motor 106 is operating. When it is desired to halt the flow of material the motor 106 is halted, whereupon the material again clogs the inclined conduit 92.

What I claim is:

1. A gateless self-clogging flow-regulating device for solid comminuted material, said device comprising a substantially wholly-enclosed and fully-sealed conduit system having upper and lower stationary closed-sided conduits having outlet and inlet ducts respectively disposed out of alignment relatively to one another both horizontally and vertically in spaced relationship with a gap therebetween, an inclined movable closed-sided conduit movably mounted in said gap between said stationary conduits and disposed in communication therewith through said ducts, said conduit being inclined at a slope sufficiently slight to normally frictionally halt and clog the flow of material therethrough but sufficiently steep to cause flow therethrough in response to agitation thereof, flexible closed-sided couplings connecting said movable conduit to said outlet and inlet ducts respectively of said stationary conduits, conduit-vibrating mechanism engageable with said movable conduit to agitate the same independently of and relatively to said ducts, and a power source drivingly connected to said vibrating mechanism.

2. A gateless self-clogging flow-regulating device for solid comminuted material, said device comprising a substantially wholly-enclosed and fully-sealed conduit system having a closed-sided material supply conduit connected to a source of material to be discharged and having an outlet duct, a closed-sided discharge-regulating conduit movably mounted in an inclined position with its upper end disposed adjacent but spaced vertically away from and in communication with said outlet duct of said material supply conduit, said conduit being inclined at a slope sufficiently slight to normally frictionally halt and clog the flow of material therethrough but sufficiently steep to cause flow therethrough in response to agitation thereof, a flexible closed-sided coupling interconnecting said adjacent ends of said conduits, conduit-vibrating mechanism engageable with said movable conduit to agitate the same independently of and relatively to said duct, and a power source drivingly connected to said vibrating mechanism.

References Cited in the file of this patent

UNITED STATES PATENTS

| 869,509 | Nelson | Oct. 29, 1907 |
| 1,926,659 | Tafel | Sept. 12, 1933 |
| 2,590,202 | Norton | Mar. 25, 1952 |

OTHER REFERENCES

Catalog—Electric Vibrating Equipment—No. 620, The Jeffrey Mfg. Co., Columbus, Ohio, p. 26. Copyright 1935.